I. K. RYSTEDT.
VULCANIZING APPARATUS.
APPLICATION FILED MAR. 11, 1921.
1,376,463.
Patented May 3, 1921.
2 SHEETS—SHEET 2.
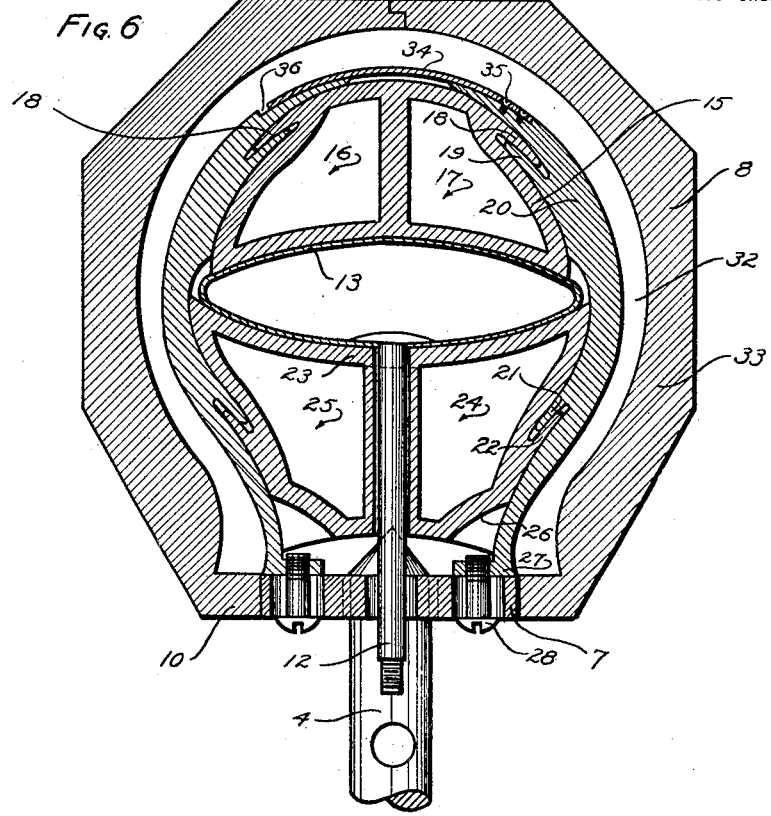
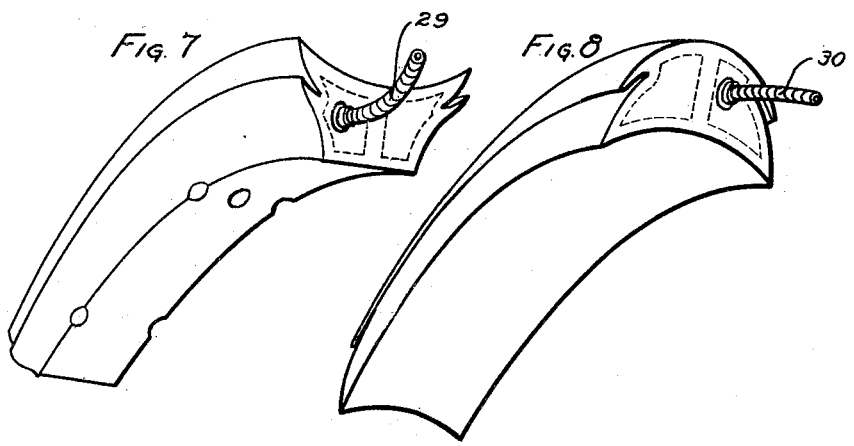
INVENTOR
Ingemar K. Rystedt
BY
Toulmin & Toulmin
ATTORNEYS

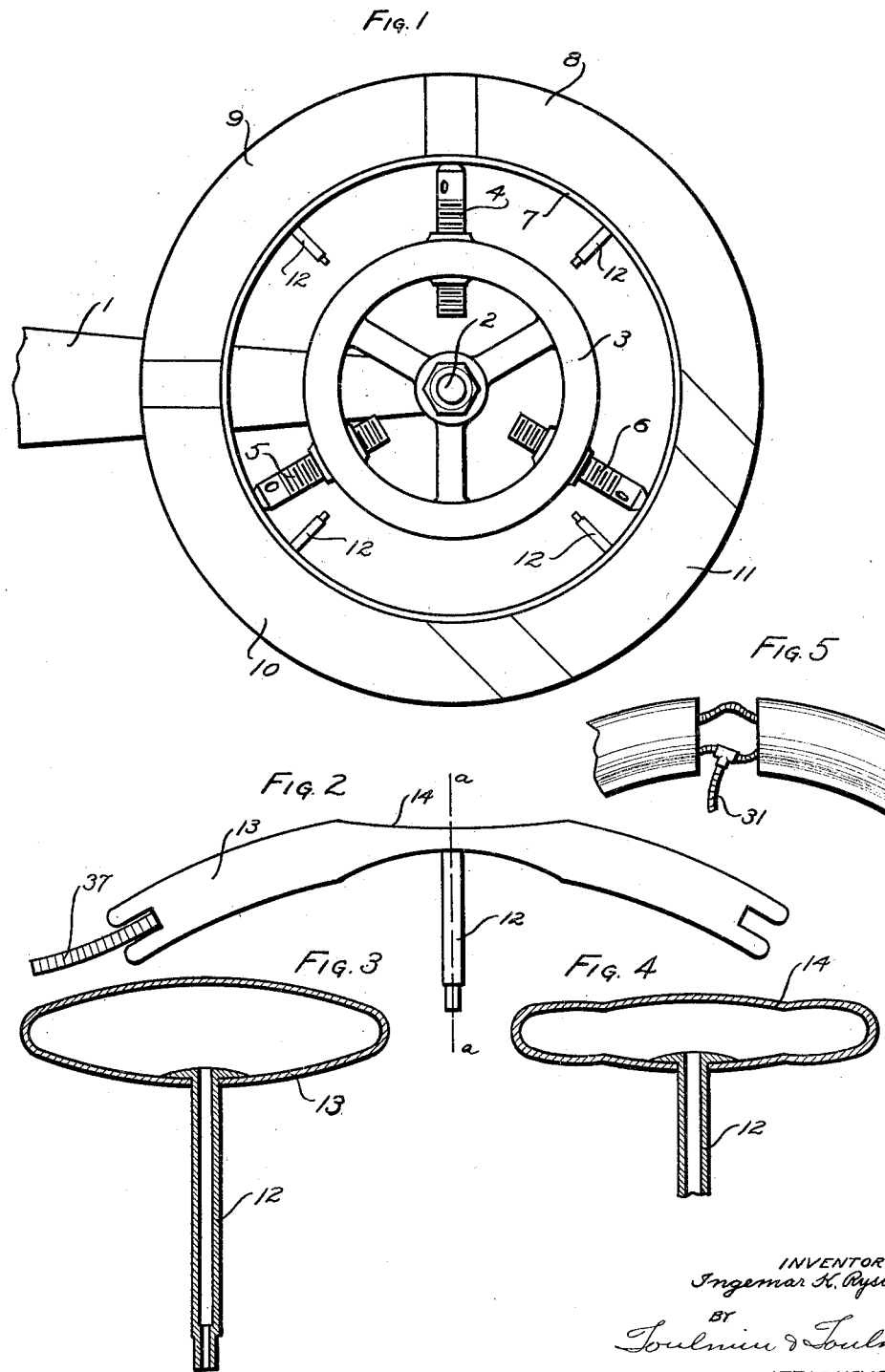

UNITED STATES PATENT OFFICE.

INGEMAR K. RYSTEDT, OF DAYTON, OHIO.

VULCANIZING APPARATUS.

1,376,463.   Specification of Letters Patent.   Patented May 3, 1921.

Application filed March 11, 1921. Serial No. 451,483.

*To all whom it may concern:*

Be it known that I, INGEMAR K. RYSTEDT, a citizen of the United States, residing at Dayton, in the county of Montgomery and State of Ohio, have invented certain new and useful Improvements in Vulcanizing Apparatus, of which the following is a specification, reference being had herein to the accompanying drawing.

My invention relates to tire cores and in particular to an apparatus for building up and vulcanizing pneumatic tires.

The object of my invention is to provide a readily collapsible tire making core which may be permanently and positively maintained in its operative position. It is also an object of my invention to provide a tire making core which may be suitably expanded after a repair has been made to the tire or during the course of making a new tire. It is a further object of my invention of providing an air bag for the expansion of the core against the tire, which may be used a large number of times, will not be damaged by the application of the heat to the tire for vulcanizing purposes, which may be readily expanded and collapsed, and which will be durable. It is my object also to provide an air bag which will not rupture and which will maintain its desired shape any length of time. It is also my object to provide such an air bag which may also contain other gases than compressed air.

It is a further object of my invention of providing a core of such an arrangement of parts that steam or other heating means may be readily applied to the core without affecting the air bag and whereby the respective parts supporting the tire and containing the steam may move relative to one another as the air bag is expanded and the core proper is likewise expanded, all without disturbing the several functions of the several parts composing the core.

It is my object to provide such an apparatus which may be readily collapsed and disassembled being removed from the tire when completed without any injury thereto.

It is an object of my invention to provide an air bag which, when expanded, will expand uniformly throughout its entire length and breadth thus providing a perfect interior configuration upon which the tire can either be molded or both molded and vulcanized and which when deflated will assume its original and normal proportions.

Referring to the drawings:

Figure 1, is a side elevation of the assembled core;

Fig. 2, is a detail view of the air bag;

Fig. 3, is a section of the air bag on the line *a—a* in its expanded condition;

Fig. 4, is a section on the same line of the air bag in its contracted position;

Fig. 5, is a detail showing the method of connection between the several sections of the core for communicating steam from one section of the core to the other for heating purposes;

Fig. 6, is a section of the core in expanded position;

Fig. 7, is a perspective of the lower half of the stem casing; and,

Fig. 8, is a perspective of the upper half of the stem casing.

Referring to the drawings, 1 is an arm of a tire stand upon which is mounted pivotally at 2 the ring 3 carrying the threaded members 4, 5 and 6. These members abut against the ring 7 upon which are bolted the sections 8, 9 and 10, and the removable section 11 which is removed first in order to collapse the core. 12—12 are the valve stems for inflating the air bag 13.

It will be seen in Fig. 2 this air bag is located in each one of the sections. The air bag is normally compressed at 14 as will be seen by reference to Fig. 4, which is taken on the line *a—a* of Fig. 2. The purpose of this is that the air or whatever medium of expansion is used will fill up the ends of the air bag and after these ends are filled up the steam will back up and expand the central area. The disadvantages of the air bag heretofore made, which have a section of constant or uniform size, is that the central area will be properly expanded but the outer ends do not assume the proper configurations and do not expand as they should.

Referring to Fig. 6, there will be seen the air bag in expanded position at 13. On the top of this bag is a steam section 15 having two steam passageways 16 and 17. The exterior of this steam member 15 has on its lateral surfaces a pair of overhanging lips 18 spaced from the main body. Inserted under either one of these lips are the shoulders 19 of the side members 20. These side members also have the downwardly projecting and inwardly extending lips 21 spaced from the main body 20 which engage with and interlock with corresponding lips 22 on the exterior surface of the lower steam member 23 which has a pair of steam chambers 24 and 25. The lower portion of this steam member 23 is cut away on either side at 26 so that as the expansion takes place, the inwardly projecting walls of 20 at 27 and the ends of the bolts 28 which attach the ring 7 to the core walls 20 may be clear.

29 and 30 are flexible connecting tubes to connect the various steam sections to one another for the free passage of steam. 31 is a supply line for the steam lines. A guiding plate or cap 34 is attached at 35 to one of the side members 20 and has its other end sliding in a depressed portion 36 of the other side member of the core.

37 is a tubular connection at one end of the air bag 13 which is utilized when it is desired to inflate the air bag from the end rather than from the center. This is usually the condition when the section 11 alone is used for repairing an existing tire. The tire is mounted upon the section 11, a sectional mold embraces the tire for the repair, and the air and steam are applied, the air in this instance being applied by 37 through the air bag 13.

*The method of operation.*

The method of operation is as follows: The sections are assembled about the ring 7 and mounted upon the tire stand being supported thereon by the ring 3 and the threaded member 6. The tire to be vulcanized is built up thereon or if already built the repaired section is made in the tire upon this core or form.

The tire will be seen in section at 32. The entire tire core and tire are placed in a mold 33. The air bag is expanded and the core brought to its point of maximum expansion so that the tire is compressed between the core and the mold while the steam is applied to secure the desired heat for vulcanizing the repair or the entire tire.

When the vulcanization is complete, the air bags are deflated, the molds removed, the steam having been taken off the cores, the ring removed, and the section 11 moved inwardly so that the other sections of the core may be collapsed and drawn through the open portion of the inner side of the tire.

Having thus fully described my invention, what I claim as new and desire to secure by Letters Patent, is:—

1. In an air bag, a main body portion at one end, a second main body portion at the other end, and a depressed area located between said main body portions, said depressed area communicating with an entrance opening into said air bag, the ends of said main portions being sealed.

2. In an air bag, a main body portion at one end, a second main body portion at the other end, a depressed area located between said main body portions, said depressed area communicating with an entrance opening into said air bag, the ends of said main portions being sealed, and said air bag being made of metal.

3. In an air bag, a main body portion at one end, a second main body portion at the other end, a depressed area between said main body portions, and means of communicating with said air bag air under pressure.

4. In an air bag, a main body portion at one end having a means therein for communicating compressed air to said air bag, a second main body portion at the other end, and a depressed area between said main body portions.

5. In a tire core, a plurality of sections supported on a ring, each of said sections being composed of side members, heating members and an expansible member contained therein, said parts being adapted to move relative to one another to accommodate the expansion and contraction of the several parts.

6. In a core for tires, a pair of side walls spaced from one another supported on a ring, means of maintaining the outer ends of said side walls in engagement with one another, steam containing members located within said side walls, means on the exterior of said steam members and the interior of said side walls for maintaining said side walls and members in engagement with one another and permitting of relative movement, and an expansible member contained within said steam members and side members.

7. In a core for tires, a pair of side walls spaced from one another supported on a ring, means of maintaining the outer ends of said side walls in engagement with one another, steam containing members located within said side walls, means on the exterior of said steam members and the interior of said side walls for maintaining said side walls and members in engagement with one another and permitting of relative movement, an expansible member contained within said steam members and side members, and means to accommodate said steam members with respect to said side walls in the collapsed position of the core.

8. In a core, a ring, a pair of side walls mounted on either edge of said ring, lips downwardly projecting and spaced from the main body of the side walls located on the inner lower side of either of said side walls, a steam member contained between said side walls having laterally located lips spaced from the main body of the steam member adapted to travel in the space between the lips on the said walls and the main body of the side walls, an expansible member mounted on said steam member, a second steam member mounted on top of the expansible member, similar means on said second steam member and on the upper part of the side walls for engaging the steam member and the side walls with one another permitting of relative movement and a cap member joined to one of said side walls and slidingly engaging the other cap member, and means of communicating pressure to the interior of said expansible member, whereby said core may be expanded and contracted.

9. In a core, a ring, a pair of side walls mounted on either edge of said ring, lips downwardly projecting and spaced from the main body of the side walls located on the inner lower side of either of said side walls, a steam member contained between said side walls having laterally located lips spaced from the main body of the steam member adapted to travel in the space between the lips on the said walls and the main body of the side walls, an expansible member mounted on said steam member, a second steam member mounted on top of the expansible member, similar means on said second steam member and on the upper part of the side walls for engaging the steam member and the side walls with one another permitting of relative movement and a cap member joined to one of said side walls and slidingly engaging the other cap member, means of communicating pressure to the interior of said expansible member, said expansible member having a depressed area normally in its central portion, whereby said core may be expanded and contracted.

10. In a core for tires, a pair of side walls spaced from one another supported on a ring, means of maintaining the outer ends of said side walls in engagement with one another, steam containing members located within said side walls, means on the exterior of said steam members and the interior of said side walls for maintaining said side walls and members in engagement with one another and permitting of relative movement, an expansible member contained within said steam members and side members, means to accommodate said steam members with respect to said side walls in the collapsed position of the core, said expansible member having a depressed area.

11. In a core, a supporting ring, side members, an upper steam member adapted to be connected with the side members and moved relative to them, said steam member having two compartments, the lower steam member having a pair of compartments separated by a dividing wall, such steam member being connected to said side members and adapted to move relative thereto, and an expansible bag member located between said steam members and said side members having its middle portion compressed normally and a means of communicating pressure to said bag member, said means being located in the dividing wall of the lower steam member and projected through the supporting ring to the exterior.

In testimony whereof, I affix my signature.

INGEMAR K. RYSTEDT.